US004001727B2

United States Statutory Invention Registration [19]

[11] Reg. Number: H1727

Jones et al.

[45] Published: May 5, 1998

[54] HEAT SEALABLE PACKAGING MATERIALS HAVING A PEELABLE, EASY-OPENING FEATURE

[76] Inventors: Gregory K. Jones, 2653 Sunnyview Rd., Appleton, Wis. 54914; Mary E. Shepard, 1036 Grove St., Oshkosh, Wis. 54901

[21] Appl. No.: 682,413

[22] Filed: Jul. 17, 1996

[51] Int. Cl.[6] ..... B29D 23/00

[52] U.S. Cl. ..... 428/35.7

[58] Field of Search ..... 428/517, 518, 428/516, 35.2, 35.3, 35.4, 34.3; 206/484; 383/109

[56] References Cited

U.S. PATENT DOCUMENTS 4,944,409 7/1990 Busche et al. ..... 206/632

*Primary Examiner*—Charles T. Jordan
*Assistant Examiner*—Meena Chelliah

[57] ABSTRACT

A heat sealable, co-extruded multi-layer packaging film with a peelable, easy-opening feature, comprising a first layer which comprises a blend of polypropylene and a primary resin. The primary resin may comprise ionomers or other acid copolymers, ethylene vinyl acetate, low density polyethylene, or linear low density polyethylene. The first layer is disposed in contact with a second outer layer, which is a heat sealant layer, comprising polybutylene. The heat sealant layer separates from said first layer when force is applied to the heat seal. The film may be laminated to additional components, and may be heat sealed to itself or to a similar film to form a package.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAT SEALABLE PACKAGING MATERIALS HAVING A PEELABLE, EASY-OPENING FEATURE

BACKGROUND OF THE INVENTION

The present invention is in the field of multilayer polymeric films and heat sealable packages made therefrom, which may be easily opened by the application of force to the seal.

The multilayer thermoplastic films are widely used in the packaging industry to form packages. Multilayer films are formed by methods of coextrusion, or by lamination.

Typically, films are sealed to form packages by way of heat sealing. Heat sealing of multilayer polymeric films means sealed or bonded by heat however obtained, for example by induction, or by magnetic, ultrasonic, radio frequency, light, laser or other energy sources which cause the polymeric materials to bond, fuse, or otherwise seal. Heat sealable packages made from polymeric films are well known in the art for packaging a variety of articles, including food products.

Packages made from multilayer polymeric films having peelable or easy-opening features are also common in the art. A peelable seal as between two films, or between a film and a substrate, is produced by any of several methods common in the art, including by heat sealing, impulse sealing, or by applications as a hot melt. Regardless of the method used, the peelable seal has a mechanical resistance to opening or peeling which results in a tight seal around a packaged item during storage until a user wants access to the packaged item. The mechanical resistance of the seal is low enough, however, to permit "easy-opening", such as by the force associated with pulling apart by hand.

One type of peelable seal mechanism is delamination-type peelable seals, in which the film peels or "delaminates" at the interface between two layers, and the two layers separate from each other.

a prior art, heat sealable film capable of being formed into a package having an easy-opening feature is disclosed in U.S. Pat. No. 4,944,409, to Busche. The package disclosed in Busche is adapted to be heat sealed closed and peelably reopened at the heat seal. The package of Busche is made from a three layer film, consisting of an outer layer, an inner sealant layer, and a tie layer disposed between the outer and inner layers. The composition of the layers is selected so that the tie layer forms a permanent bond with the layer of the interface for which a permanent bond is desired, and forms a peelable bond at the other interface for which a peelable bond is desired.

It is an object of the invention to provide a multilayer film, and packages made therefrom, having a novel, improved delamination type peelable heat seal mechanism.

SUMMARY OF THE INVENTION

This invention is for a novel multilayer polymeric film for use in peelably opening packages. The film has improved consistency and is more easily processed than prior art films. In addition, the film has advantages over the prior art films in that the costs associated with the manufacture and production of the film are lower.

The multilayer film of the invention has a first interior layer which comprises a blend of a polypropylene, including both homopolymers and copolymers of polypropylene, and a primary resin. The primary resin may comprise one or more of the following components: an ionomer or another acid copolymer, ethylene vinyl acetate (EVA), low density polyethylene (LDPE), and linear low density polyethylene (LLDPE).

The film also comprises a second outer layer, which is a heat sealant layer, which is disposed in contact with the first interior layer. The heat sealant layer comprises a blend of polybutylene and a copolymer which may be any of the various copolymers commonly used in heat sealant layers, such as, for example, LDPE, LLDPE, EVA, EAA, and an ionomer. The heat sealant layer is disposed near or immediately adjacent the first interior layer.

The heat sealant layer of the film may be heat sealed to itself or to a similar sealant layer of a second film. The film itself may be laminated to additional components, such as to a substrate.

When force is applied to the heat seal, such as the force associated with pulling apart by hand, the sealant layer separates by delamination from the first polypropylene-containing layer, resulting in a peelably opening or easy-opening package.

DETAILED DESCRIPTION OF THE INVENTION

Figure 1:
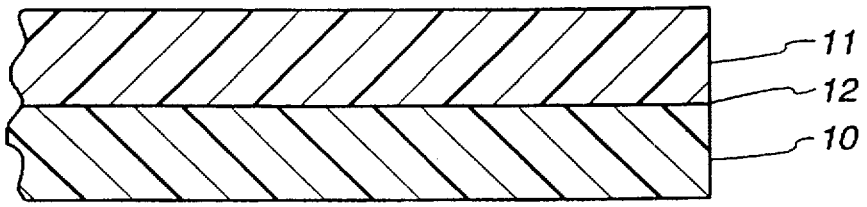
FIG. 1 shows a cross-section of films of the invention.

FIG. 1 shows a cross-section of the first embodiment of the films of the invention. Layer 10 is a first interior layer which is a blend of polypropylene and a primary resin, comprising an ionomer, an acid copolymer, ethylene vinyl acetate, low density polyethylene and linear low density polyethylene. The polypropylene layer includes both homopolymers and copolymers of polypropylene.

Layer 11 is a second outer layer, which is a heat sealant layer. Layer 11 is disposed in surface-to-surface contact with layer 10. The heat sealant layer comprises polybutylene and a copolymer which may be any of the various copolymers commonly used in heat sealant layer. These include but are not limited to low density polyethylene ("LDPE"), linear low density polyethylene ("LLDPE"), high density polyethylene ("HDPE"), ethylene vinyl acetate ("EVA"), ethylene methacrylate ("EMA"), ethylene acrylic acid ("EAA"), and ionomers, as well as copolymers containing these polymers. Heat seal layers common in the art also include blends, in varying percentages, of the above-referenced polymers.

In this embodiment of the film, when force is applied to the heat seal, such as by the force associated with pulling apart by hand, the sealant layer 11 separates from the first layer 10 at point 12.

Figure 2:
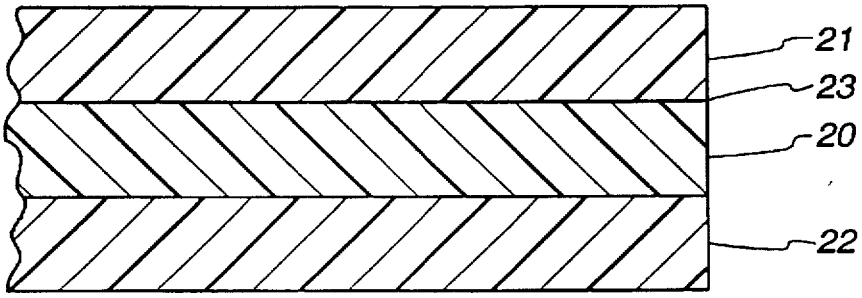
FIG. 2 shows a cross-section of an alternative embodiment of the films of the invention.

FIG. 2 depicts a second embodiment of the films of the invention. In this embodiment, layer 20 is the first interior layer and layer 21 is the outer sealant layer. As in the first embodiment, the first interior layer 20 and outer sealant layer 21 are disposed in surface-to-surface contact. The substrate is represented by layer 22. Layer 20 and layer 22 are adhered through any of several methods common in the art, such as by lamination.

As in the first embodiment, when force is applied to the heat seal, such as the force associated with pulling apart by hand, the sealant layer 21 separates from the first layer 20 at point 23.

The substrate layer 22 may be an additional film, to which the film of the invention is bonded by any of several methods common in the art, including by way of an adhesive or through lamination. Alternatively, the substrate 22 may be comprised of a material such as paper, cardboard, metal or any of several other materials.

What is claimed is:

1. A multilayer, heat sealable polymeric film, comprising a first interior layer comprising polypropylene and a polymer selected from the group consisting of an ionomer, an acid copolymer, EVA, LDPE, and LLDPE; a second outer layer comprising polybutylene and a polymer selected from the group consisting of LDPE, LLDPE, EVA, EAA, and an ionomer, said second outer layer being heat sealable; said first interior layer and said second outer layer being disposed in face-to-face contact, wherein said first interior layer and said second outer layer form a delamination type peelable seal.

2. A film as described in claim 1, wherein said film is coextruded.

3. A film as described in claim 1, wherein said first interior layer is laminated to a substrate.

4. A film as described in claim 1, wherein said substrate is selected from the group consisting of paper, cardboard, and metal.

5. A package made from the film of any of claims 1 to 4, wherein said first interior layer is heat sealed to itself.

6. A package made from the film of any of claims 1 to 4, wherein said first interior layer is heat sealed to a second polymeric film.

* * * * *